(12) United States Patent
Pignataro et al.

(10) Patent No.: US 10,153,949 B2
(45) Date of Patent: *Dec. 11, 2018

(54) SUB-TOPOLOGY DISCOVERY FOR OPERATING HYBRID SOLUTIONS

(71) Applicant: Cisco Technology, Inc., San Jose, CA (US)

(72) Inventors: Carlos M. Pignataro, Raleigh, NC (US); Rajesh Kumar, Palo Alto, CA (US); Marc Holloman, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,469

(22) Filed: Sep. 29, 2016

(65) Prior Publication Data

US 2017/0019311 A1   Jan. 19, 2017

Related U.S. Application Data

(62) Division of application No. 13/289,330, filed on Nov. 4, 2011, now Pat. No. 9,497,081.

(51) Int. Cl.
*H04L 12/24* (2006.01)
*H04L 12/751* (2013.01)

(52) U.S. Cl.
CPC ........ *H04L 41/145* (2013.01); *H04L 41/0856* (2013.01); *H04L 41/12* (2013.01); *H04L 45/02* (2013.01); *H04L 41/147* (2013.01); *H04L 41/22* (2013.01)

(58) Field of Classification Search
CPC combination set(s) only.
See application file for complete search history.

(56) References Cited

U.S. PATENT DOCUMENTS

| | | | |
|---|---|---|---|
| 6,112,015 A * | 8/2000 | Planas | H04L 41/22 709/220 |
| 7,917,854 B1 * | 3/2011 | Beaudoin | H04L 41/12 715/734 |
| 9,497,081 B2 | 11/2016 | Pignataro et al. | |
| 2002/0143855 A1 | 10/2002 | Traversat et al. | |
| 2005/0108379 A1 | 5/2005 | Gray et al. | |
| 2010/0191857 A1 | 7/2010 | Donin De Rosiere | |
| 2011/0082939 A1 | 4/2011 | Montemurro et al. | |
| 2011/0082940 A1 | 4/2011 | Montemurro et al. | |
| 2012/0113809 A1 | 5/2012 | Cortes Gomez | |
| 2013/0114462 A1 | 5/2013 | Pignataro et al. | |

* cited by examiner

*Primary Examiner* — Yee Lam
(74) *Attorney, Agent, or Firm* — Merchant & Gould P.C.

(57) ABSTRACT

Network topology information may be determined for a plurality of network devices on a network. System identifier information may then be determined for each of the plurality of network devices on the network. The system identifier information may be a list of network solutions that each network device actually or potentially belongs to. The system may then flag the system identifier information to indicate whether each solution is an actual or a potential solution.

18 Claims, 5 Drawing Sheets

US 10,153,949 B2

SUB-TOPOLOGY DISCOVERY FOR OPERATING HYBRID SOLUTIONS

RELATED APPLICATION

This application is a division of U.S. application Ser. No. 13/289,330 entitled "Sub-Topology Discovery for Operating Hybrid Solutions" filed Nov. 4, 2011, now U.S. Pat. No. 9,497,081, which is incorporated herein by reference.

BACKGROUND

System identifiers may be defined such that devices may be identified as to whether they are operating as part of a specific operating hybrid solution. A device may be queried to find out their associated "system id". However, the nature of operating hybrid solutions (or "systems") is such that it may be a multi-device sub-topology (or logical topology) over a network. As such, there is a need to determine the specific sub-topology that is capable (or configured) for a particular operating hybrid solution.

Furthermore, by definition, operating hybrid solutions may be tied to Whole Offers ("WOs") in which the actual system is the entity sold and supported by a vendor. By extension, there also exists a need for discovery of a WO within the topology.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
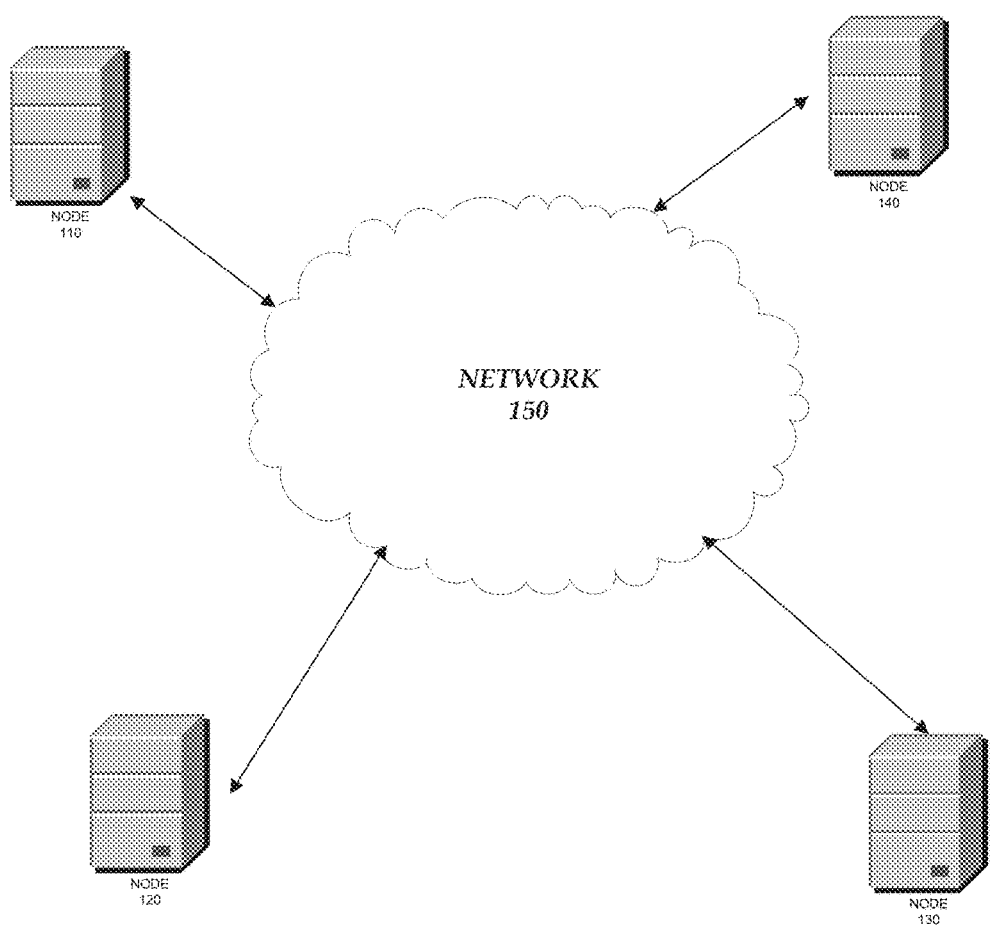
FIG. 1 is an illustration of an operating environment for embodiments described herein.

Consistent with embodiments of the present disclosure, systems and methods are disclosed for sub-topology discovery. For example network topology information may be determined for a plurality of network devices on a network. System identifier information may then be determined for each of the plurality of network devices on the network. The system identifier information may be a list of network solutions that each network device actually or potentially belongs to. The system may then flag the system identifier information to indicate whether each solution is an actual or a potential solution.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the present disclosure are configured to work with any multi-layer topology discovery protocol (e.g., Layer 2, Layer 3, Layer 7, etc.). A discovered system identifier may be advertised as an information element tied to each particular device or node in: 1) responses to topology discovery queries from a neighbor during a topology discovery protocol crawl; 2) responses to topology discovery polls from a central server or process such as a Network Management System ("NMS") or service process; 3) link state advertisements in link-state routing protocols such as Open Shortest Path First ("OSPF"); and 4) automatic advertisements, such as Cisco Discovery Protocol ("CDP"). Link-state protocols, or instances of them, may be inherently topology discovery protocols in that they allow a node to build a topology map of a network or subnet of which it is a part.

FIG. 1 illustrates a sample operating environment for embodiments of the present disclosure. A plurality of nodes (network devices), such as node 110, node 120, node 130, and node 140, may be in communication over a network 150. Network 150 may comprise any appropriate communications network on which a plurality of devices may be in communication with one another.

Depending on the determined topology discovery protocol, the discovered device or node may be an L2 entity, such as a switch, a wireless LAN controller ("WLC"), or a wireless access point ("WAP"). Furthermore, the discovered device or node may be an L3 entity such as a router, an L7 entity such as a media endpoint in a MediaNet, an application endpoint, a media server, or an application server. It should be understood that the above list is exemplary and other appropriate network devices are compatible with embodiments of the present disclosure.

Each node may be associated with a system identifier. In some embodiments, the system identifier may comprise a list of solutions ("systems") (e.g., TrustSec, EnergyWise, MediaNet, etc.) that the node potentially or actually belongs to. Each element in the system identifier list may be flagged as "potential" or "actual" to indicate whether the said capability has been configured on the node, or is operationally active. The system identifier information element associated with the topology discovery protocol may correspond to a similar system identifier data structure within a discovered node. Alternatively, in some embodiments, the system identifier information element associated with the topology discovery protocol may be derived from the primary capabilities and configuration data ("operating criteria") within the node.

The existence of multiple instances of the same whole offer or system overlay within a network, while not common, is not precluded. Thus, it may be possible for the system identifier to be able to distinguish between different releases of a whole offer via different entries (e.g., Offer X Release 1 v. Offer X Release 2) in the supported solutions list that comprises the system identifier for a device. This may allow for a seamless WO upgrade, by way of identifying which network elements within a system are capable of running Release 2, and which network elements are not. It is also possible to have different instances of the same release. For example, different nodes within an enterprise may be served by different policy servers, resulting in multiple, coexisting whole offers of the same genre.

Network topology data may be collected in several ways. For example, a central entity, such as an NMS or a service process may poll network devices within certain address ranges (or scopes) for neighborhood (device, link) information. Alternatively, an initiator node (such as a router or a switch) within the network may initiate a low-resource layer 2 network crawl with sophisticated duplicate request suppression and looping suppression mechanisms.

In the network crawl, nodes may request and subsequently receive topology/neighborhood information from their layer 2 neighbors and propagate this information back to the initiator node (or nodes) which serve as gateways to a centralized NMS or a service process. It should be understood that link layer topology discovery protocols discover not only switches, but also routers, servers, endpoints, and other network devices relevant to a whole offer strategy.

Another set of mechanisms for topology discovery may involve leveraging the link state data collected via layer 3 routing protocols such as OSPF. A NMS or service process may collect this data from several routing nodes in order to construct a complete picture of the network. This is due to a routing node having complete link state information for only a specific area of the network. The link-state also opaquely advertises system capability or belonging. Layer 3 topology maps address routing nodes and do not show switches, application servers, media servers, etc. which are relevant to solutions such as TrustSec and MediaNet.

Although the level of information gleaned from layer 2 discovery may be different than the information gleaned via layer 3 discovery, embodiments of this disclosure are compatible with any of the network topology methods described above and other known methods.

Once network topology data is collected, the annotation of nodes by a multi-element system identifier record may allow several innovative use cases. For example, topology layout and rendering engines can, on user command, collapse the network/subnet layout into an overlay system or solution layout. The overlay system or solution layout may emphasize functions and relationships that signify a specific system or whole offer. In some embodiments, other renderings may show multiple overlays within the same network topology graph. Each overlay may be indicated by a different color. In some embodiments, system overlay information may be viewable by right-clicking on nodes and/or links.

Based on the supported capabilities, the readiness of a network or subnet to support a specific solution or a whole offer overlay may be assessed. This allows the additional identification of whether an operating hybrid solution is complete (i.e., configured, ready, or operational to have the complete system implemented network-wide.

Furthermore, the multi-element system identifier allows for the streamlining of the assessment of the consistency, completeness, best practice conformance and regulatory compliance of a specific system overlay by allowing system-specific elements to be teased out from the irrelevant ones. This allows for quick and intelligent sifting which facilitates post-assessment optimization.

Identifying the elements of a solution also may aid whole offer billing. Element identification may also provide a correlation of whole offer support entitlement with device-level support entitlement. This provides a solution capable of being integrated into a network community (or cloud networking environment) such that a network device can advise of system faults.

Streamlining network-level troubleshooting by allowing support personnel to dynamically show and/or hide contexts. Contexts may include mobility contexts, energy management contexts, and other relevant contexts as needed, regardless of how the information is presented.

Topology discovery schemes may also detect changes between successive runs. These changes may result from node/link up/down transitions, and from moves, adds, changes, and deletes to the system. The ability to conveniently filter this information by whole offer and/or system (e.g., TrustSec policy servers and switches) simplifies solution administration, debugging, triage, etc. Regardless of whether whole-offer based filtering is supported or not, a distinction between planned and unplanned changes must be made on the basis of other criteria, such as monitoring and configuration change management.

Monitoring systems, such as CISCO Mediatrace, may enable the isolation and troubleshooting of network degradation problems for data streams. The monitoring system runs may fetch the system identifier from various layer 2 and layer 3 nodes in the trace path. This opens up the possibility of correlating system features support in various nodes in the trace path with the measured performance (delay, jitter, loss, etc.) of the path segments associated with the nodes.

Figure 2:
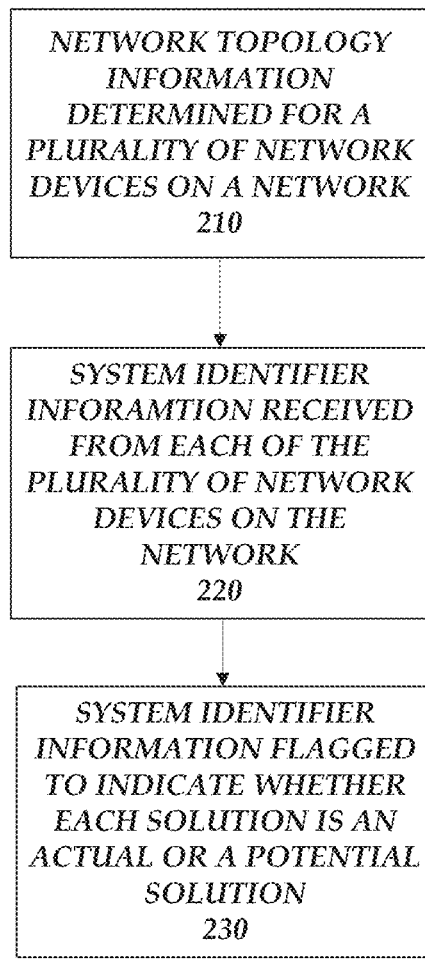
FIG. 2 is a flow chart of embodiments for providing a dynamic space.

FIG. 2 is a flow chart illustrating embodiments of the present disclosure. Method 200 may begin at step 210 where network topology information may be determined for a plurality of network devices on a network. Network topology information may be obtained through any of the procedures described above or other appropriate discovery protocols.

Method 200 may then proceed to step 220. At step 220, system identifier information may be received from each of the plurality of network devices on the network. In some embodiments the system identifier information may comprise a list of network solutions that each network device actually or potentially belongs to.

System identifier information may be obtained in a number of fashions. For example, the system identifier information may be received as a response to topology discovery queries performed by a neighbor network device. In some embodiments, the response to topology discovery queries may be the result of a topology discovery protocol crawl. Alternatively, system identifier information may be received as a response to topology discovery poll initiated by a central server device on the network.

In some embodiments, the system identifier information may be received as a response to topology discovery poll initiated by an NMS service process. Alternatively, in some embodiments, the system identifier information may be received as a response to link-state advertisements in a link-state routing protocol. The link-state routing protocol may be OSPF, for example.

Method 200 may then proceed to step 230. At step 230, the system identifier information may be flagged to indicate whether each solution is an actual or a potential solution.

Figure 3:
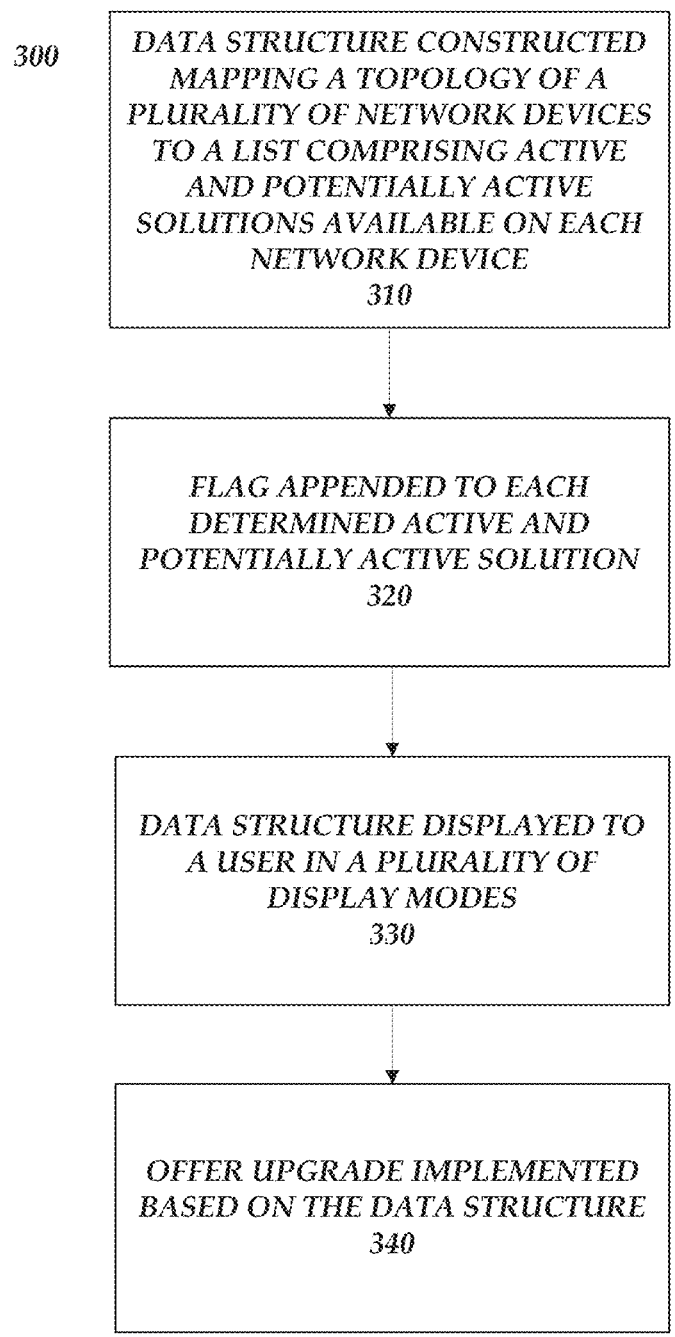
FIG. 3 is a flow chart of embodiments for providing a dynamic space.

FIG. 3 is a flow chart illustrating embodiments of the present disclosure. Method 300 may begin at step 310 where a data structure may be constructed mapping a topology of a plurality of network devices to a list comprising active and potentially active solutions available on each network device on a network. In some embodiments, the active and potentially active solutions available on each network device may be derived from capabilities and configuration data for each network device. These capabilities and configuration data may be stored on a memory associated with a network device. In some embodiments, step 310 may further include determining release version data for the determined active and potentially active solutions.

Method 300 may then proceed to step 320. At step 320, a flag may be appended to each determined active and potentially active solution, wherein the flag indicates whether the particular solution is currently active or potentially active.

Method 300 may then proceed to step 330. At step 330, the data structure may be displayed to a user in a plurality of display modes. Method 300 may then proceed to step 340. At step 340, a whole offer upgrade may be implemented based on the data structure.

Figure 4:
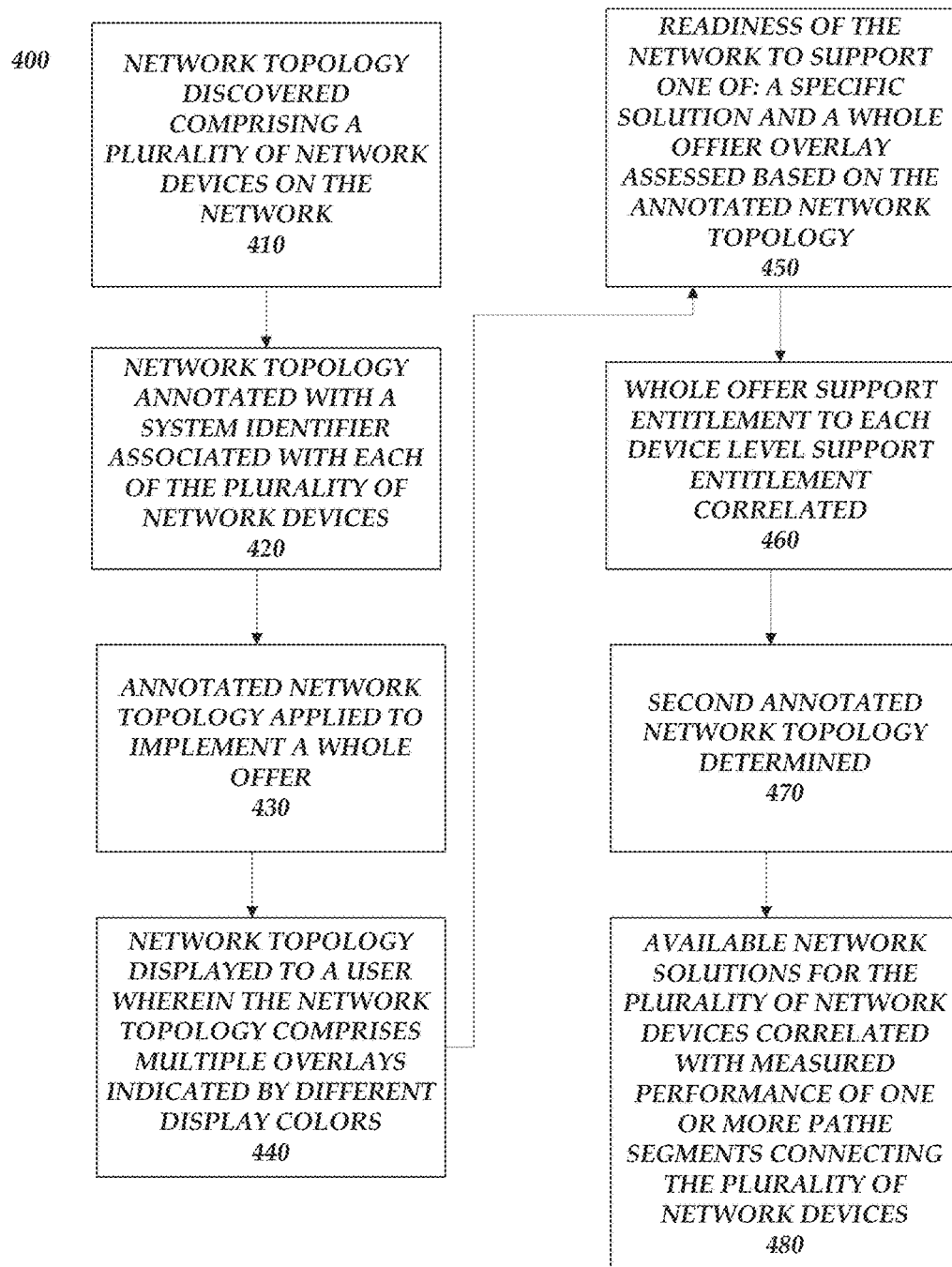
FIG. 4 is a flow chart of embodiments for providing a dynamic space.

FIG. 4 is a flow chart illustrating embodiments of the present disclosure. Method 400 may begin at step 410 where a network topology may be discovered comprising a plurality of network devices on the network.

Method 400 may proceed to step 420. At step 420 the network topology may be annotated with a system identifier associated with each of the plurality of network devices, wherein the system identifier comprises a list of network solutions associated with the particular network device.

Next, at step 430 the annotated network topology may be applied to implement a whole offer. At step 440, the network topology may be displayed to a user wherein the network topology comprises multiple overlays indicated by different display colors. It should be understood that an end user may be either human or a machine interface.

Next, at step 450, the readiness of the network to support one of: a specific solution and a whole offer overlay may be assessed based on the annotated network topology. As part of the assessment, solution-specific may be teased out elements from non-solution specific elements.

Method 400 may proceed to step 460 where the whole offer support entitlement to each device level support entitlement may be correlated. Subsequently, at step 470, a second annotated network topology may be determined. Changes between the first annotated network topology and the second annotated network topology may then be identified and assessed.

Finally, method 400 may proceed to step 480. At step 480, available network solutions for the plurality of network devices may be correlated with measured performance of one or more path segments connecting the plurality of network devices.

Figure 5:
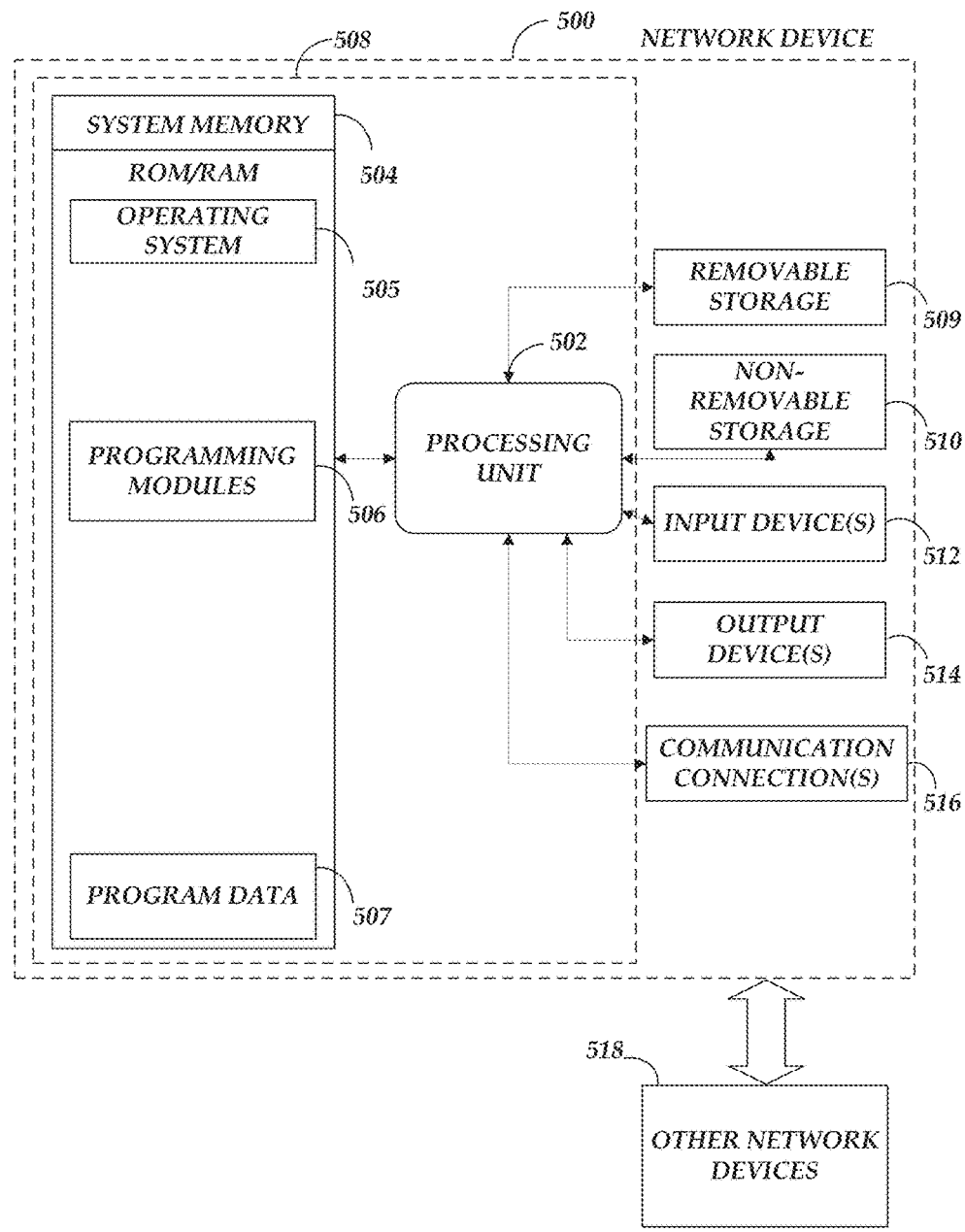
FIG. 5 is a block diagram of a network computing device.

FIG. 5 is a block diagram of a system including network device 500. Consistent with embodiments of the present disclosure, the aforementioned memory storage and processing unit may be implemented in a network device, such as network device 500 of FIG. 5. Any suitable combination of hardware, software, or firmware may be used to implement the memory storage and processing unit. For example, the memory storage and processing unit may be implemented with network device 500 or any of other network devices 518, in combination with network device 500. The aforementioned system, device, and processors are examples and other systems, devices, and processors may comprise the aforementioned memory storage and processing unit, consistent with embodiments of the present disclosure.

With reference to FIG. 5, a system consistent with embodiments of the present disclosure may include a network device, such as network device 500. In a basic configuration, network device 500 may include at least one processing unit 502, a secure processing unit for decryption 520, and a system memory 504. Depending on the configuration and type of network device, system memory 504 may comprise, but is not limited to, volatile (e.g., random access memory (RAM)), non-volatile (e.g., read-only memory (ROM)), flash memory, or any combination. System memory 504 may include operating system 505, one or more programming modules 506, and may include program data 507. Operating system 505, for example, may be suitable for controlling network device 500's operation. Furthermore, embodiments of the present disclosure may be practiced in conjunction with a graphics library, other operating systems, or any other application program and is not limited to any particular application or system. This basic configuration is illustrated in FIG. 5 by those components within a dashed line 508.

Network device 500 may have additional features or functionality. For example, network device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 500. Any such computer storage media may be part of device 500. Network device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Network device 500 may also contain a communication connection 516 that may allow device 500 to communicate with other network devices 518, such as over a network in a distributed network environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 or secure processing unit for decryption 520, programming modules 506 may perform processes including, for example, one or more method 200, 300, and 400's stages as described above. The aforementioned process is an example; processing unit 502 and secure processing unit for decryption 520 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. An apparatus comprising:
a memory; and
a processor, wherein the processor is configured to:
discover a network topology comprising a plurality of network devices;
annotate the network topology with a system identifier associated with each of the plurality of network devices, wherein the system identifier comprises a list of network solutions associated with a particular network device, wherein each element of the list of network solutions is flagged to indicate whether a corresponding network solution is at least one of the following: configured and operationally active and configured but operationally not active on the particular network device, and wherein the processor being configured to annotate the network topology comprises the processor being configured to:
append an actual flag to a first element associated with a first network solution on the list, the actual flag indicating that the first network solution is operationally active on the particular network device, and
append a potential flag to the first element associated with a second network solution on the list, the potential flag indicating that the second network solution is configured but not operationally active on the particular device; and
determine, based on the annotated network topology, whether to implement at least one of the following: a specific solution and a whole offer, wherein the processor being configured to determine comprises the processor being operative to tease solution specific elements from non-solution specific elements, wherein the system identifier distinguishes between different releases of the whole offer via different entries in the list of network solutions.

2. The apparatus of claim 1, wherein the processor is further configured to display the network topology wherein the network topology comprises multiple overlays indicated by different display colors.

3. The apparatus of claim 1, wherein the processor is further configured to:
correlate a whole offer support entitlement to each device level support entitlement; and
detect system faults.

4. The apparatus of claim 1, wherein the processor is further configured to:
determine a second annotated network topology; and
detect changes between the annotated network topology and the second annotated network topology.

5. The apparatus of claim 1, wherein the processor is further configured to correlate available network solutions for the plurality of network devices with measured performance of one or more path segments connecting the plurality of network devices.

6. The apparatus of claim 1, wherein the list of network solutions comprises: TrustSec, EnergyWise, and MediaNet.

7. The apparatus of claim 1, wherein the processor is further configured to collapse a network layout of the plurality of network devices into at least one of the following: an overlay system layout and a whole offer layout, wherein the overlay system layout and the whole offer layout specify functions and relationships that signify a overlay system or the whole offer.

8. A method comprising:
discovering a network topology comprising a plurality of network devices;
annotating the network topology with a system identifier associated with each of the plurality of network devices, wherein the system identifier comprises a list of network solutions associated with a particular network device, wherein each element of the list of network solutions is flagged to indicate whether a corresponding network solution is at least one of the following: configured and operationally active and configured but operationally not active on the particular network device, and wherein annotating the network topology comprises:
appending an actual flag to a first element associated with a first network solution on the list, the actual flag indicating that the first network solution is operationally active on the particular network device, and
appending a potential flag to the first element associated with a second network solution on the list, the potential flag indicating that the second network solution is configured but not operationally active on the particular device; and
determining, based on the annotated network topology, whether to implement at least one of the following: a specific solution and a whole offer, wherein determining comprises teasing solution specific elements from non-solution specific elements, wherein the system identifier distinguishes between different releases of the whole offer via different entries in the list of network solutions.

9. The method of claim 8, further comprising displaying the network topology wherein the network topology comprises multiple overlays indicated by different display colors.

10. The method of claim 8, further comprising:
correlating a whole offer support entitlement to each device level support entitlement; and
detecting system faults.

11. The method of claim 8, further comprising:
determining a second annotated network topology; and
detecting changes between the annotated network topology and the second annotated network topology.

12. The method of claim 8, further comprising correlating available network solutions for the plurality of network devices with measured performance of one or more path segments connecting the plurality of network devices.

13. The method of claim 8, wherein the list of network solutions comprises: TrustSec, EnergyWise, and MediaNet.

14. A non-transitory computer-readable medium that stores a set of instructions which when executed perform a method executed by the set of instructions comprising:
discovering a network topology comprising a plurality of network devices;
annotating the network topology with a system identifier associated with each of the plurality of network devices, wherein the system identifier comprises a list of network solutions associated with a particular network device, wherein each element of the list of network solutions is flagged to indicate whether a corresponding network solution is at least one of the following: configured and operationally active and configured but operationally not active on the particular network device, and wherein annotating the network topology comprises:
appending an actual flag to a first element associated with a first network solution on the list, the actual flag indicating that the first network solution is operationally active on the particular network device, and
appending a potential flag to the first element associated with a second network solution on the list, the potential flag indicating that the second network solution is configured but not operationally active on the particular device; and
determining, based on the annotated network topology, whether to implement at least one of the following: a specific solution and a whole offer, wherein determining comprises teasing solution specific elements from non-solution specific elements, wherein the system identifier distinguishes between different releases of the whole offer via different entries in the list of network solutions.

15. The non-transitory computer-readable medium of claim 14, further comprising displaying the network topology wherein the network topology comprises multiple overlays indicated by different display colors.

16. The non-transitory computer-readable medium of claim 14, further comprising:
correlating a whole offer support entitlement to each device level support entitlement; and
detecting system faults.

17. The non-transitory computer-readable medium of claim 14, further comprising:
determining a second annotated network topology; and
detecting changes between the annotated network topology and the second annotated network topology.

18. The non-transitory computer-readable medium of claim 14, wherein the list of network solutions comprises: TrustSec, EnergyWise, and MediaNet.

\* \* \* \* \*